United States Patent [19]

Fukui et al.

[11] Patent Number: 4,974,403
[45] Date of Patent: Dec. 4, 1990

[54] GRASS CUTTING SYSTEM HAVING A GRASS CATCHER

[75] Inventors: Tetsu Fukui; Shigekazu Hasegawa; Yoshimi Oota, all of Sakai, Japan

[73] Assignee: Kubota, Ltd., Osaka, Japan

[21] Appl. No.: 318,089

[22] Filed: Mar. 2, 1989

[30] Foreign Application Priority Data

| Mar. 4, 1988 | [JP] | Japan | 63-52197 |
| Apr. 20, 1988 | [JP] | Japan | 63-97122 |
| Jul. 7, 1988 | [JP] | Japan | 63-169471 |
| Jul. 21, 1988 | [JP] | Japan | 63-96653[U] |

[51] Int. Cl.$^5$ .................................. A01D 34/12
[52] U.S. Cl. ............................................. 56/202
[58] Field of Search ............... 56/202, 194, 199, 200, 56/320.2, 12.8

[56] References Cited

U.S. PATENT DOCUMENTS

| 2,990,666 | 7/1961 | Blume | 56/202 X |
| 3,398,514 | 8/1968 | Nolan | 56/202 X |
| 4,030,273 | 6/1977 | Leader | 56/202 |
| 4,081,947 | 4/1978 | Szymanis | 56/202 |
| 4,087,955 | 5/1978 | Szymanis | 56/202 |
| 4,244,164 | 1/1981 | Szymanis | 56/202 |
| 4,263,771 | 4/1981 | Iaboni et al. | 56/202 X |
| 4,361,001 | 11/1982 | Almond et al. | 56/202 X |
| 4,835,951 | 6/1989 | Walker | 56/202 X |

FOREIGN PATENT DOCUMENTS 62-17830  2/1987  Japan.

*Primary Examiner*—Ramon S. Britts
*Assistant Examiner*—Matthew Smith
*Attorney, Agent, or Firm*—Jordan and Hamburg

[57] ABSTRACT

A grass cutting system for use on a walking operator type or a riding type lawn mower as mounted between front and rear wheels. This grass cutting system comprises a cutting blade rotatable on a vertical axis, a grass catcher disposed above the cutting blade and defining a top opening, and a housing surrounding the grass catcher. A cylindrical space is defined between the grass catcher and the housing, through which grass clippings are fed with air currents from the cutting blade to the grass catcher.

21 Claims, 9 Drawing Sheets

GRASS CUTTING SYSTEM HAVING A GRASS CATCHER

BACKGROUND OF THE INVENTION

The present invention relates to an improvement for simplifying the construction of a grass cutting system having a cutter blade rotatable on a vertical axis and a grass catcher for collecting grass clippings, and to riding type and walking operator type lawn mowers equipped with an improved grass cutting system.

Conventional walking operator type lawn mowers, generally, comprise a vehicle body including ground wheels, an engine and a steering handle. The vehicle body carries a cutting blade, and a grass catcher consisting of a net bag or a plastic box mounted, for example, on a rear face of the vehicle body. Where the grass catcher is mounted on the rear face or the like of the vehicle body, it is necessary to transmit grass clippings tangentially of the locus of rotation of the cutting blade. Thus a grass transmitting passage takes the form of a duct extending approximately horizontally and rearwardly of the vehicle body.

With the type of lawn mower that transmits grass clippings horizontally, however, the grass to be cut could be turned sideways by air currents flowing horizontally, thereby impairing a desired grass cutting operation. In order to eliminate this inconvenience, a construction has recently been developed, as disclosed in Japanese Utility Model Publication Kokai No. 62-17830, wherein a cutting blade produces upward air currents to maintain in an upright orientation the grass to be cut. According to this construction, grass clippings are transmitted upwardly by the upward air currents, without using a duct or the like, to a grass catcher disposed above the cutting blade.

Further, the grass catcher in the construction disclosed in the Japanese publication is in the form of a ring in plan view. The grass clippings move upward with the air currents through the center of the grass catcher, and are thereafter delivered to peripheral positions of the grass catcher.

Where the grass catcher is in the form of a ring, however, the bottom surface thereof must be formed into a smooth horn shape. This grass catcher, therefore, is not only complicated in construction and troublesome to manufacture but presents difficulties to enlargement of its grass storing capacity.

SUMMARY OF THE INVENTION

The object of the present invention is to provide a grass cutting system which retains the advantages of disposing the grass catcher above the cutting blade, and yet allows the grass catcher to have a simple construction and to be readily enlarged for an increased grass storing capacity.

In order to achieve the above object, a grass cutting system according to the present invention comprises cutting blade means including a cutting blade rotatable on a vertical axis, grass catcher means disposed above the cutting blade means and defining a top opening, housing means surrounding the grass catcher means, and a flow space defined between the grass catcher means and the housing means and communicating at one end thereof with the cutting blade means and at the other end with the top opening defined in the grass catcher means, grass clippings being fed with air currents from the cutting blade means to the grass catcher means through the flow space.

In this construction, the grass clippings cut by the cutting blade means are transmitted with air currents produced by the cutting blade means, upwardly through the flow space between the outer wall of the grass catcher means and the housing means. The grass clippings are then guided to the top opening of the grass catcher means to fall inside the grass catcher means.

Thus, according to this grass cutting system, grass is held erect in an upright orientation by the upward air currents produced by the cutting blade means. This feature provides the advantages of allowing the grass to be cut to desired lengths, and feeding the grass clippings without necessitating a special feed duct. The grass catcher means may have any selected size and shape as long as the grass catcher means fits inside the housing means. No duct is required specially for directing the air currents to the center of the grass catcher means.

In a preferred embodiment of the present invention, the grass catcher means has a cylindrical outer shape, and the housing means includes a cylindrical portion having a larger diameter than and surrounding a lateral wall of the grass catcher means, and a lid portion closable on a top plane of the cylindrical portion, the guide means being provided on the lid portion. The housing means includes guide means opposed to the top opening of the grass catcher means for guiding the grass clippings to the top opening.

Further, the guide means may advantageously include, centrally thereof, an exhaust passage for discharging the air currents fed from the cutting blade means, and guide vanes extending radially from the exhaust passage.

With this construction, the air currents entraining the grass clippings into the top opening of the grass catcher means escape upwardly through the exhaust passage defined centrally of the guide means, namely at the position with a maximum spacing from outer edges of the grass catcher means. Even small fragments of grass which are less subjected to the action of the guide means become stalled during the time for the air currents to reach the exhaust passage. As a result, such small fragments of grass will readily fall through the top opening of the grass catcher.

In a further preferred embodiment, the grass catcher means includes a porous cylinder in a central position thereof. In this case, air currents passing through grass clippings accumulated in the grass catcher means are allowed to escape through the porous cylinder into the exhaust passage. This feature is effective to avoid lowering of grass collecting performance due to an increased flow rate of the air currents at the top opening of the grass catcher means.

Thus the present invention provides an improved grass cutting system in which the air currents from the cutting blade means are allowed to flow through a passage outside the grass catcher means. This grass cutting system allows the grass catcher means to have a simple construction and to be readily enlarged for an increased grass storing capacity, while retaining the advantages of disposing the grass catcher means above the cutting blade means.

The exhaust passage formed centrally of the guide means allows even small fragments of grass to be collected in the grass catcher means without difficulty. The porous cylinder mounted inside the grass catcher means allows the grass catcher means to store grass clippings substantially to the full capacity thereof.

The feature that the grass catcher means is placed in the housing means with a spacing therebetween is advantageous particularly where the grass catcher means is removable by drawing out of the housing means. Such spacing allows the grass catcher means to be drawn out with ease.

The foregoing and other objects, features and advantages of the invention will be apparent from the following more particular description of preferred embodiments of the invention, as illustrated in the accompanying drawings.

DESCRIPTION OF THE PREFERRED EMBODIMENTS

First, an embodiment wherein a grass cutting system according to the present invention is incorporated into a walking operator type lawn mower will be described with references to FIGS. 1 through 5.

Figure 1:
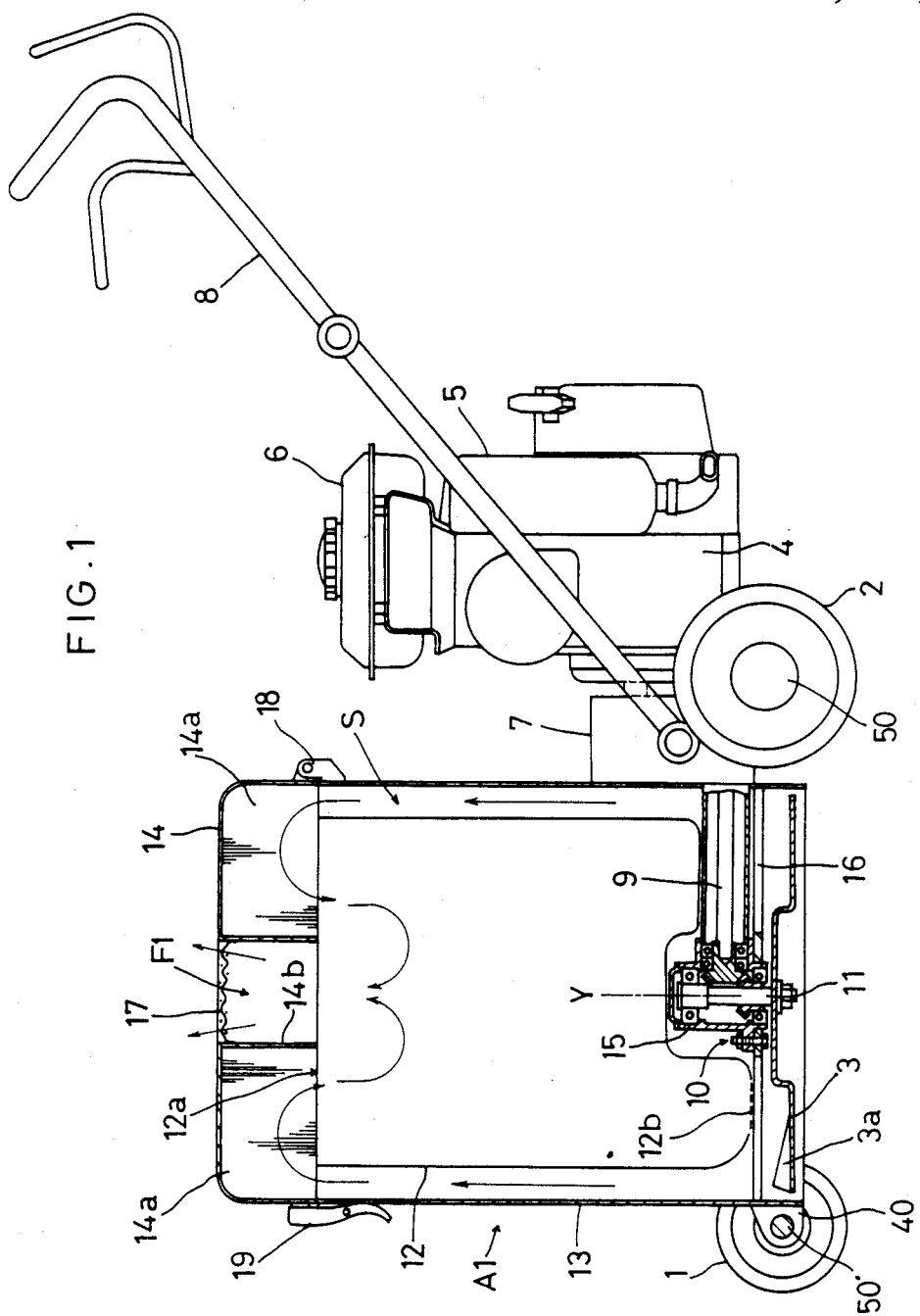
FIG. 1 is a side view, partly in section, of a walking operator type lawn mower equipped with a grass cutting system according to the present invention.

FIG. 1 is a side view, partly broken away, of the walking operator type lawn mower. This lawn mower comprises a vehicle body supported by freely rotatable front wheels 1 and rear drive wheels 2. The vehicle body carries, at a forward position thereof, a grass cutting system A1 including a cutting blade 3 rotatable on a vertical axis Y. The vehicle body further carries, at rearward positions thereof, an engine 4, a muffler 5, a fuel tank 6, a transmission case 7, and a steering handle 8 extending rearwardly.

The transmission case 7 contains a reduction mechanism for transmitting drive at a reduced rate to the drive wheels 2. As seen, a blade drive line includes a horizontal transmission shaft 9, an output shaft 11 directly connected to the cutting blade 3, and two bevel gears 10 for providing right-angle transmission between the transmission shaft 9 and output shaft 11. The cutting blade 3 defines fins 3a for producing upward air currents.

Figure 2:
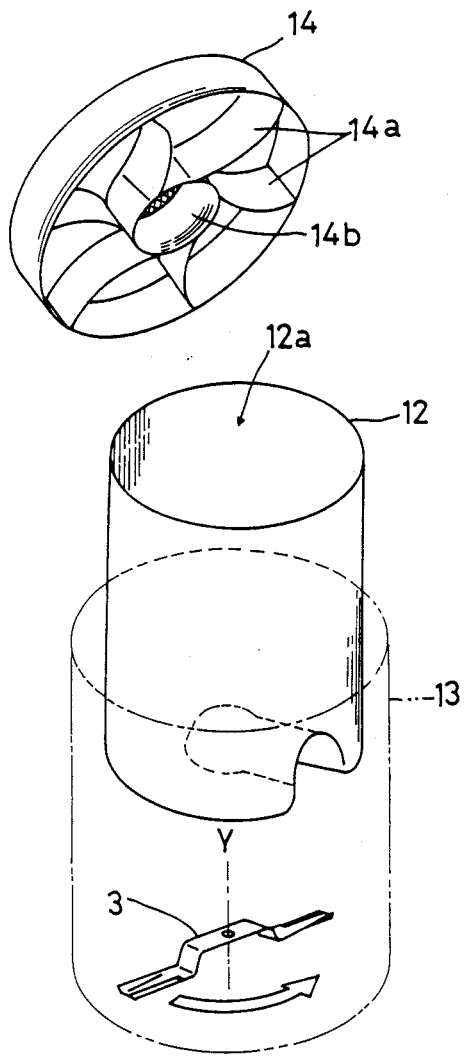
FIG. 2 is an exploded perspective view of a grass catcher, a cylindrical member and other associated components.

As shown in FIGS. 1 and 2, the grass cutting system A1 includes the cutting blade 3, a grass catcher 12a disposed above the blade 3 and defining a top opening 12, a cylindrical member 13 acting as a housing for guiding the upward air currents produced by rotation of the cutting blade 3, and a guiding device 14 for guiding grass clippings and air currents fed through an annular space S between the cylindrical member 13 and grass catcher 12 to the opening 12a of grass catcher 12. This guiding device 14 acts also as a lid of the cylindrical member 13. The grass cutting system A1 contains, in a lower position thereof, a gear case 15 supported on a bar-like stay 16 and housing the bevel gears 10 and output shaft 11. The grass catcher 12 is removable by drawing upwardly out of the cylindrical member 13. The grass catcher 12 defines a meshed bottom portion 12b acting as an air vent. The lid or guiding device 14 includes a plurality of vanes 14a for directing the grass clippings fed with the upward air current through the space S between the grass catcher 12 and cylindrical member 13 toward the center of the opening 12a of the grass catcher 12, and a cylindrical passage 14b defining an exhaust path F1 for delivering the centrally directed grass clippings downwardly and allowing the air current to flow upwardly through the center of the guiding device 14. The exhause path F1 includes a mesh member 17 for preventing leakage of the grass clippings. The lid or guiding device 14 is connected to the cylindrical member 13 through a hinge 18 which allows the lid or guiding device 14 to be opened and closed. Further, a buckle 19 is provided between the guiding device 14 and the cylindrical member 13 to retain the guiding device 14 in a closed position.

For varying the height of the cutting blade 3 from the ground, namely the grass cutting height, the freely rotatable wheels 1 and drive wheels 2 may be constructed vertically adjustably relative to the vehicle body. One example of variable height wheel support structure will be described next.

Figure 4:
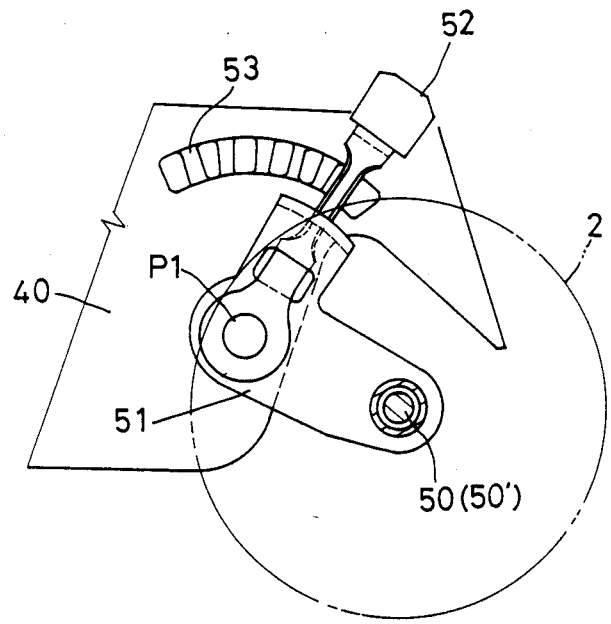
FIG. 4 is a schematic side view of a wheel height adjusting mechanism.
Figure 5:
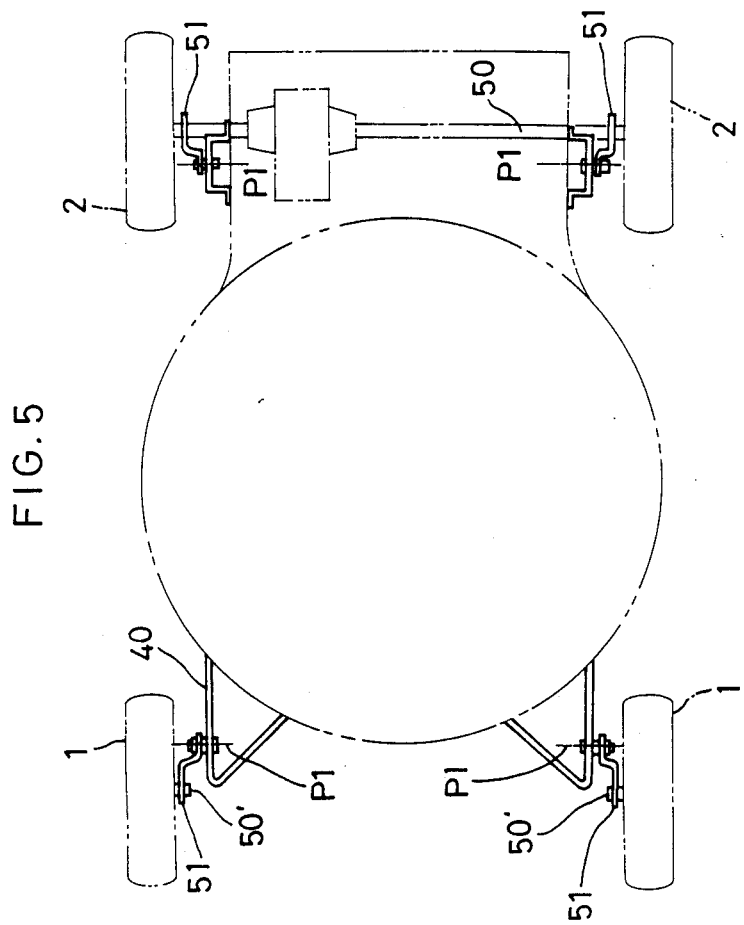
FIG. 5 is a schematic plan view of the wheel height adjusting mechanism.

As shown in FIGS. 4 and 5, this support structure includes a bracket 40 to which a support 51 supporting an axle 50 or 50' is connected for pivotal movement about a transverse axis P1. The support 51 is pivotable by a control lever 52. The control lever 52 has a leaf spring structure with a distal end thereof urged inwardly of the vehicle body for selectively locking in a plurality of engaging grooves 53 provided on an outer surface of the bracket 40, thereby fixing the axle 50 or 50', i.e. fixing the wheel 1 or 2, to a selected height. In this case, of course, the mechanism for transmitting the drive to the drive wheels 2 includes a known flexible transmission device.

The experiments carried out by the inventors show that the air currents produced by the rotation of cutting blade 3 flow whirling upwardly as does a windspout. On the basis of this finding, the vanes 14a are shaped into a spiral form for directing the grass clippings toward the center of the opening 12a of the grass catcher 12 in accordance with the whirling of the air currents.

Figure 3:
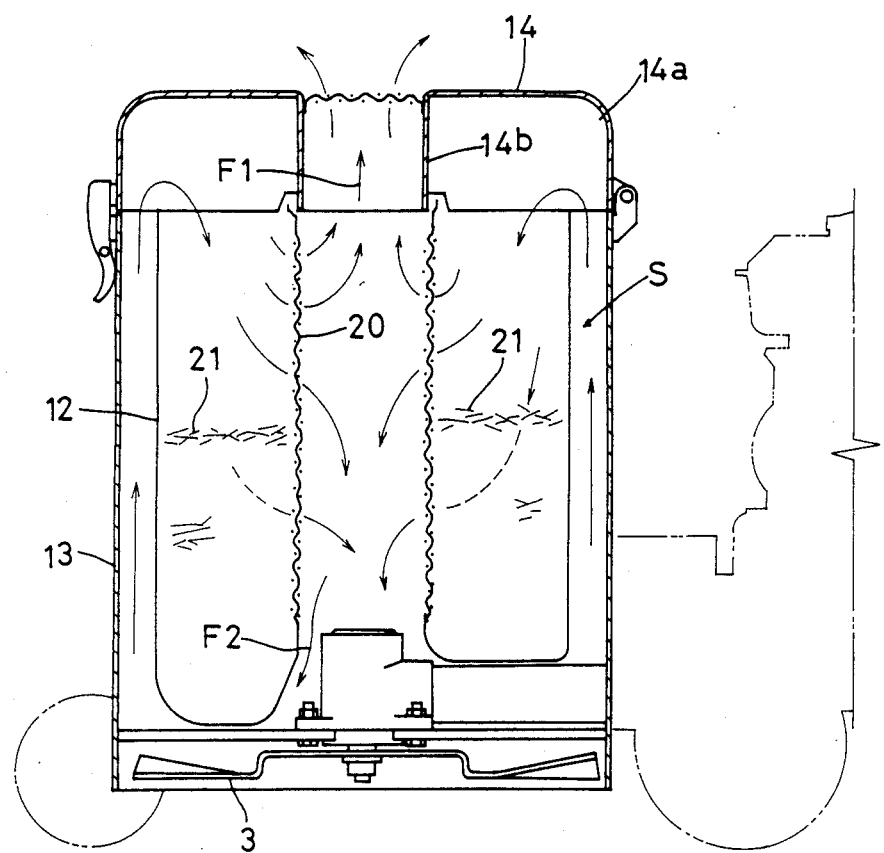
FIG. 3 is a side view showing air flows through the grass cutting system.

Referring to FIG. 3, the grass catcher 12 includes a porous cylinder 20 formed of a net material and extending vertically through a central position of the grass catcher 12. The air currents are discharged from the porous cylinder 20 through upper and lower exhaust paths F1 and F2 outwardly of the grass cutting system. Thus the air currents flowing in through the opening 12a of the grass catcher 12, including those currents that pass through grass clippings collected in the grass catcher 12, flow to the exhaust paths F1 and F2 as indicated by arrows in FIG. 3.

The cutting blade 3 produces the air currents flowing upward from peripheral positions of its locus of rotation, and air currents flowing downward from adjacent the center of rotation. The downward air currents are utilized as suction for venting the air currents downwardly through the lower exhaust path F2.

A second embodiment wherein a grass cutting system according to the present invention is incorporated into a riding type lawn mower will be described with reference to FIGS. 6 through 10.

Figure 6:
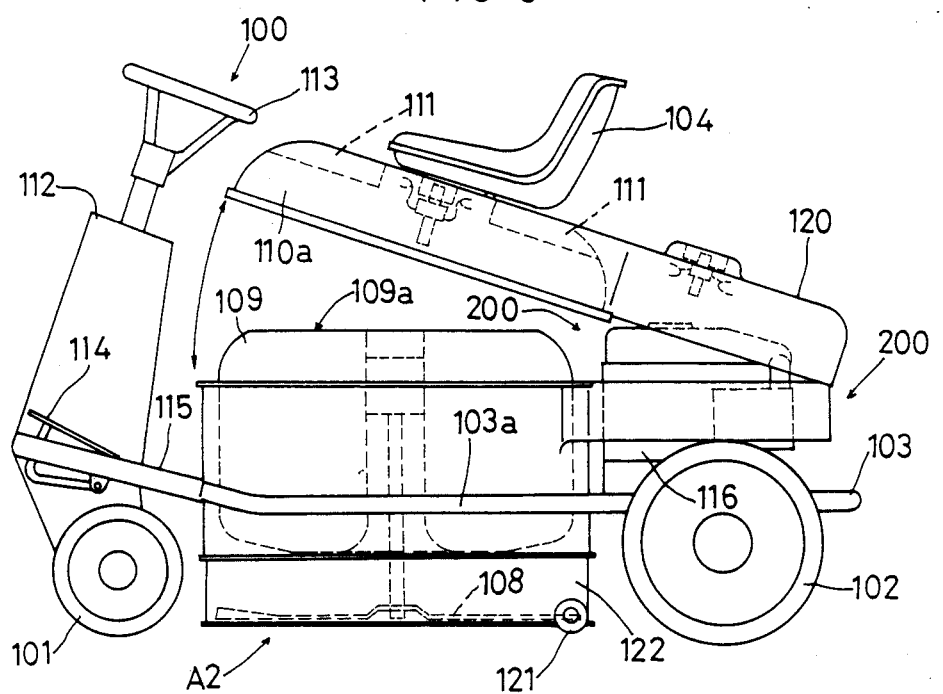
FIG. 6 is a side view of a riding type lawn mower equipped with a grass cutting system according to the present invention.

Referring to FIG. 6, the riding type lawn mower comprises a vehicle frame 103 supported by front wheels 101 and rear drive wheels 102. The vehicle frame 103 carries a driver's section 100 at a forward position thereof, and a motor section 200 at a rearward position thereof. A grass cutting system A2 is mounted between the front wheels 101 and rear wheels 102. A driver's seat 104 is mounted on the top of the grass cutting system A2.

Figure 7:
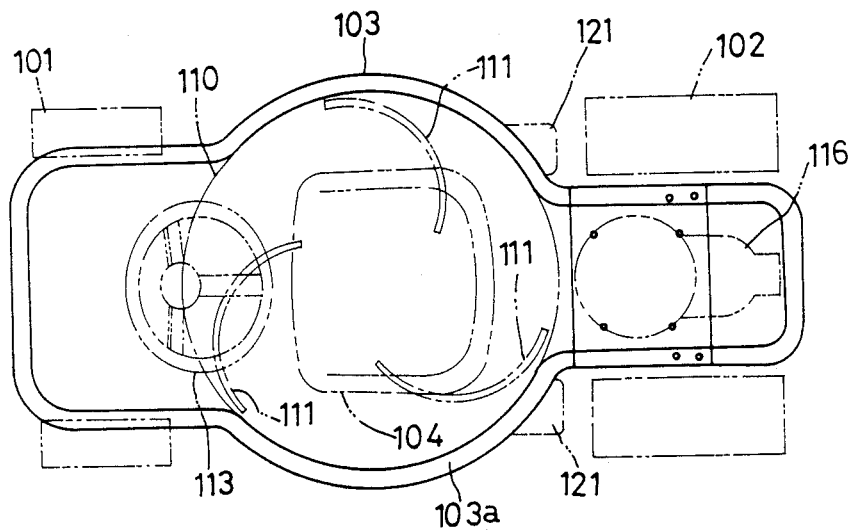
FIG. 7 is a schematic plan view of the riding type lawn mower.

As shown in FIG. 7, the vehicle frame 103 comprises steel pipes interconnected in a loop form for increased rigidity. The vehicle frame 103 projects laterally outwardly at intermediate positions longitudinally of the lawn mower, for accommodating the grass cutting system A2 between projecting portions 103a. Each projecting portion 103a has an arcuate shape extending along an outer periphery of the grass cutting system A2, for guarding a side wall of the grass cutting system A2 against external objects.

Figure 8:
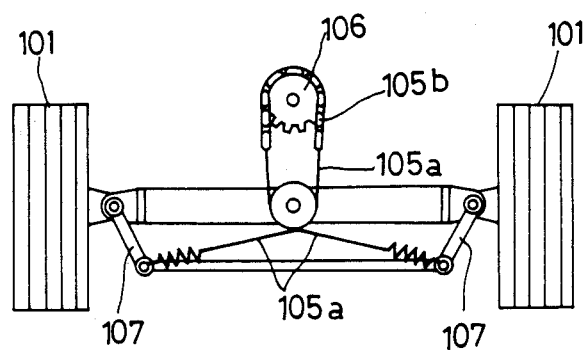
FIG. 8 is a schematic plan view of a front wheel steering structure of the lawn mower shown in FIG. 6.

As shown in FIG. 8, the front wheels 101 are steerable by a compact structure employing wires 105a and a chain 105b. The wires 105a are connected to opposite ends of the chain 105b wound around a sprocket 106. The other end of each wire 105a is connected to a knuckle arm 107 of either front wheel 101. According to this construction, the front wheels 101 are steerable by turning a steering wheel 113 to rotate the sprocket 106 which pushes and pulls the wires 105a relative to each other.

The front wheels 101 have a caster angle of 10-20 degrees (FIG. 6) for a small turning radius and an excellent straight running capability.

Figure 9:
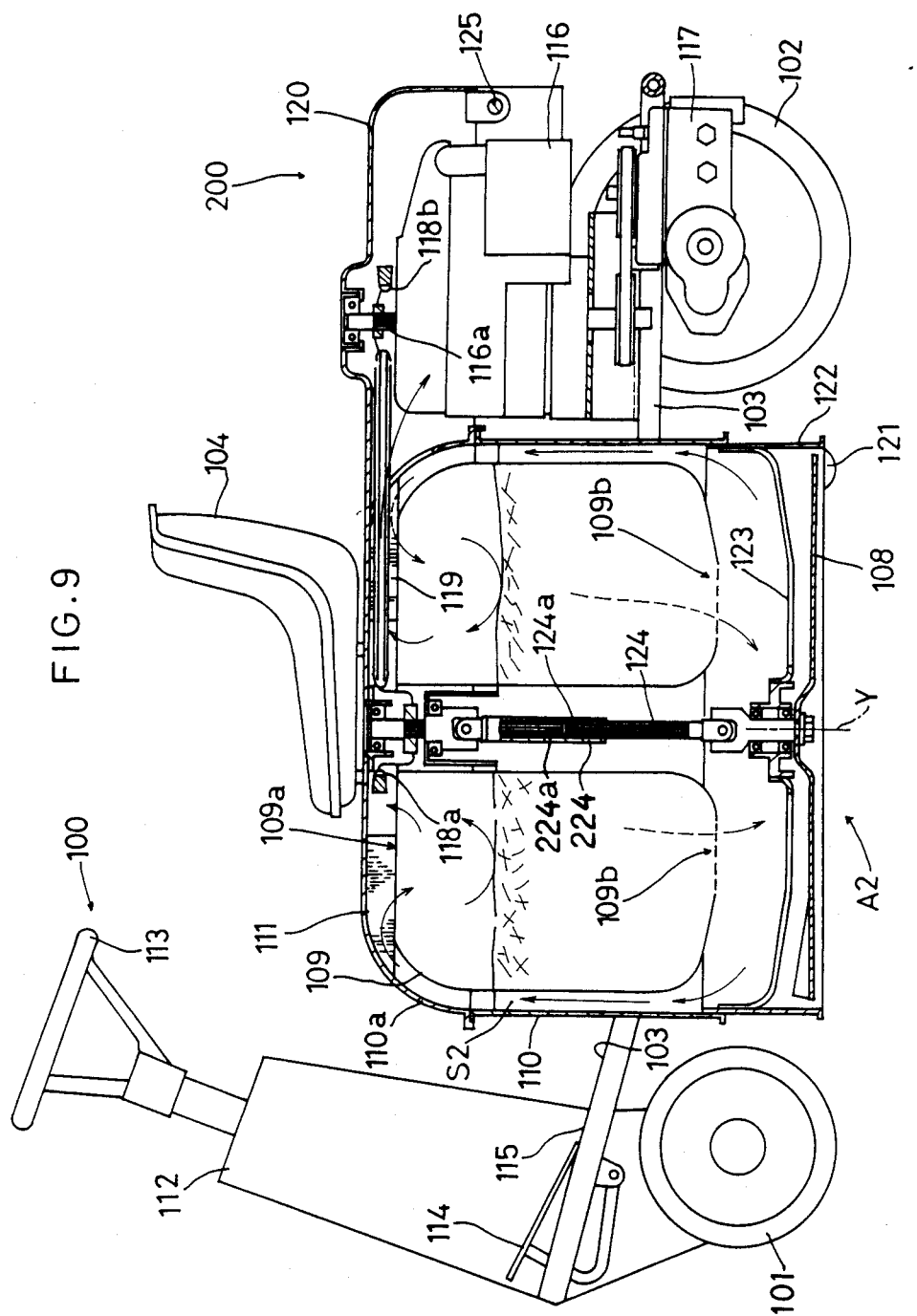
FIG. 9 is a side view, partly in section, of the lawn mower shown in FIG. 6.

As shown in FIG. 9, the grass cutting system A2 includes a cutting blade 108 rotatable on a vertical axis Y, a grass catcher 109 disposed above the blade 108, and a housing 110 accommodating the blade 108 and grass catcher 109. Grass clippings cut by the blade 108 are transported upwardly through a cylindrical space S2 between the outside surface of the grass catcher 109 and the inside surface of the housing 110 as entrained on whirling air currents produced by rotation of the cutting blade 108. The grass clippings are then guided toward the center by a plurality of vanes 111 defined on an undersurface of the top of the grass cutting system A2, and dropped through an opening 109a defined at the top of grass catcher 109.

The driver's section 100 includes a steering column 112, the steering wheel 113 for steering the front wheels 101, foot pedals 114 and foot rests 115. The motor section 200 includes an engine 116, and a transmission case 117 for transmitting drive from the engine 116 to the rear wheels 102. The grass cutting system A2 is operatively connected to the engine 116 through a belt transmission mechanism including two pulleys 118a and 118b and an endless belt 119.

The grass cutting system A2 has a lid-like member 110a disposed above the housing 110 to be separable upwardly therefrom. The lid-like member 110a extends rearwardly to define a cover 120 for covering the motor section 200 from above.

A cylindrical member 122 having ground wheels 121 is vertically movably fitted in a lower end of the housing 110. The cylindrical member 122 carries a bracket 123 attached to the inside wall thereof for supporting the cutting blade 108. To allow the vertical movement of the cylindrical member 122, a drive shaft 124 of the cutting blade 108 includes at an intermediate position thereof splines 124a engaging with splines 224a in a sleeve 224 in which the shaft 124 is telescopically received.

The cover 120 is supported at a rear end thereof to be pivotable about a transverse axis 125.

An output shaft 116a of engine 116 and the drive shaft 124 of cutting blade 108 are separably engaged with the belt transmission mechanism. As shown in FIG. 6, the grass catcher 109 containing grass clippings may readily be removed once the integral lid-like member 110 and cover 120 are opened upwardly.

As shown in FIG. 7, the vanes 111 in the grass cutting system A2 are shaped into a spiral form since the air currents produced by the cutting blade 108 flow upward through the cylindrical space S2. The grass catcher 109 defines a meshed bottom portion 109b. Consequently, the air currents resulting from the rotation of the cutting blade 108 flow upward through peripheral positions and, after being guided to the center, flow downward. The upwardly flowing air currents are utilized to raise grass on the ground peripherally of the cutting blade 108 for an accurate grass cutting operation. The downwardly flowing air currents impart suction for collecting grass clippings.

The air currents flow in the grass cutting system A2 as indicated by arrows in FIG. 9. As seen, a large part of air reaching the top of the grass cutting system A2 flows rearwardly, and other part of air flows downwardly through the grass clippings in the grass catcher 109.

The riding type lawn mower may conveniently comprise a vehicle frame 103 including a pair of right and left frames extending longitudinally of the lawn mower and interconnected at front and rear positions thereof.

Figure 10:
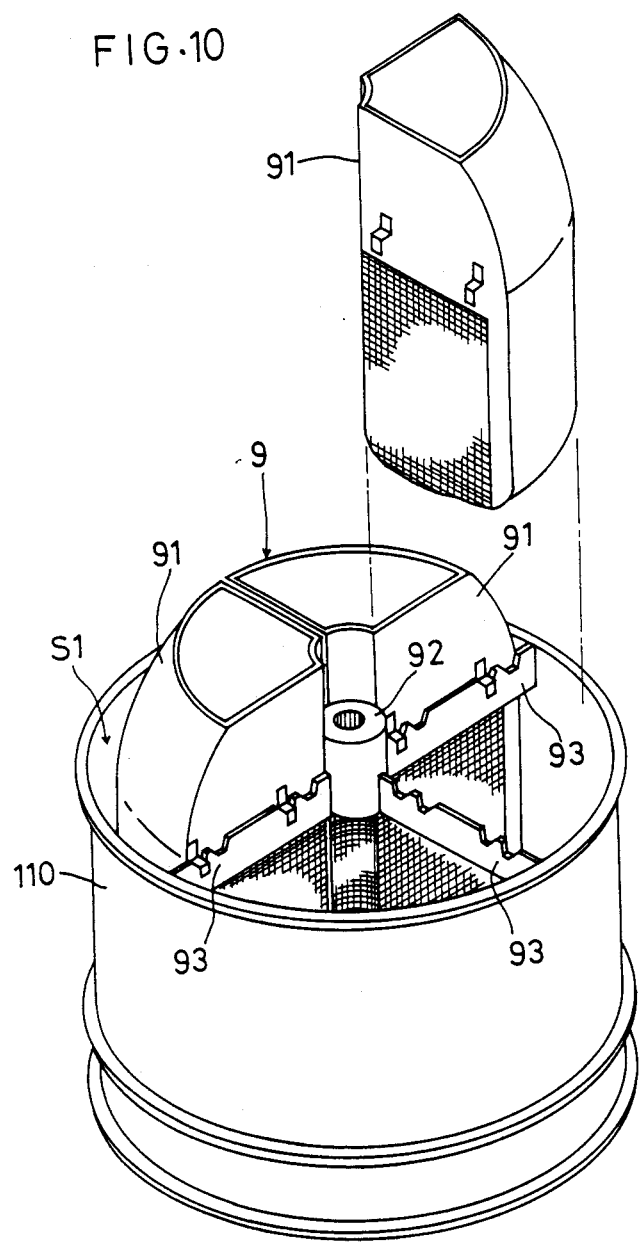
FIG. 10 is a perspective view of a grass catcher used with the lawn mower of FIG. 6.

FIG. 10 shows a grass catcher 9 radially divided into four sub-containers 91 each of which may be handled as a unit. These sub-containers 91 are suspended from four support frames 93 extending from a bearing holder 92 to the housing 110. Each sub-container 91 defines meshed inner walls and a meshed bottom wall for venting the air currents.

Figure 11:
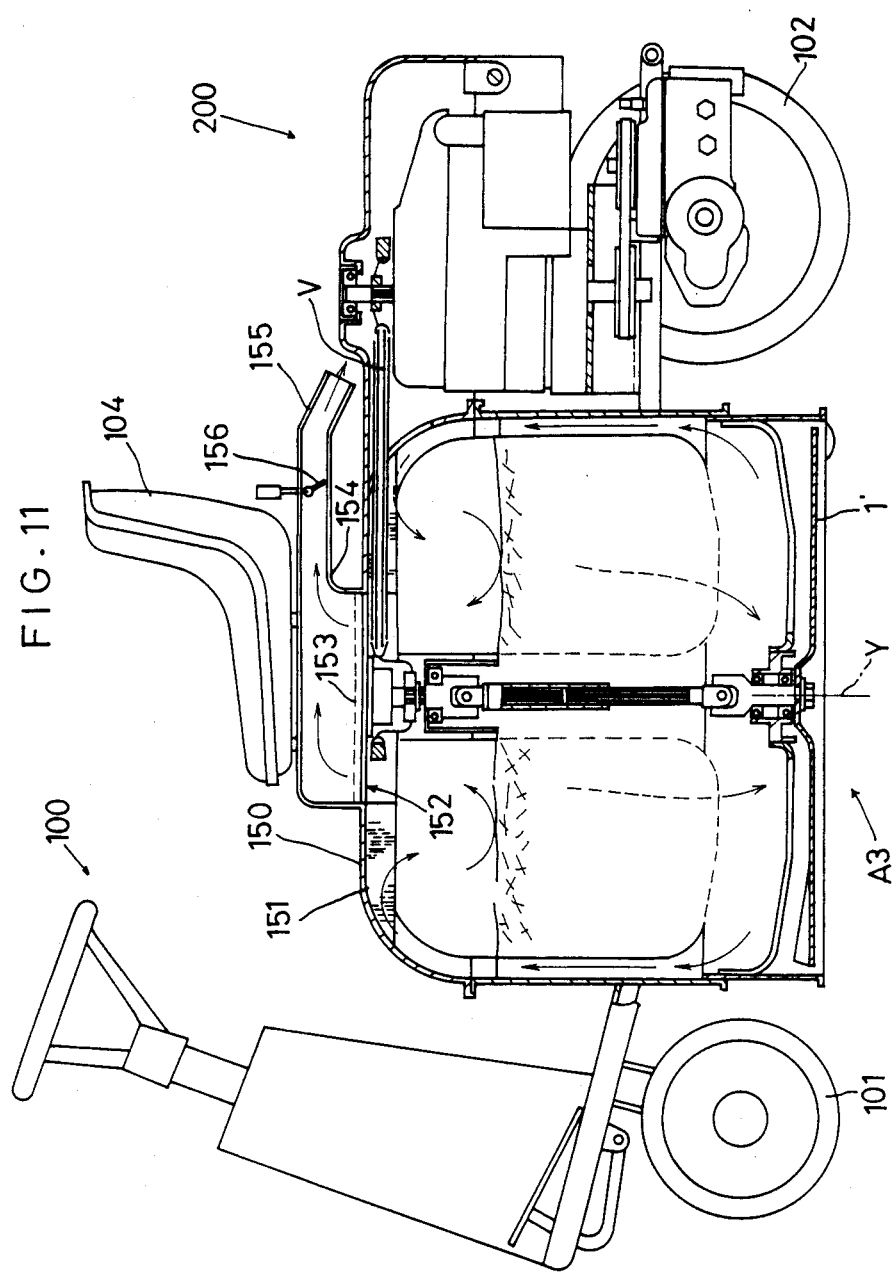
FIG. 11 is a side view, partly in section, of another riding type lawn mower.

FIG. 11 shows another riding type lawn mower which includes a grass cutting system A3 different from the preceding embodiment in the air exhausting construction. The components affixed with like reference numbers have the same functions as in the preceding embodiment.

The illustrated lid-like member 150 defines an exhaust port 152 centrally of vanes 151. The exhaust port 152 includes a netting 153, and an exhaust pipe 155 is connected thereto for discharging air currents outwardly through a passage 154 disposed below the driver's seat 104. The exhaust pipe 155 includes a flow adjusting plate 156 pivotably mounted in a rearward position thereof. The amount of air discharged outwardly may be varied by varying the posture of this adjusting plate 156, thereby to adjust the amount of air fed to the grass catcher 109.

What is claimed is:

1. A grass cutting system comprising:
cutting blade means including a cutting blade rotatable on a vertical axis,
grass catcher means disposed above said cutting blade means and defining a top opening, said grass catcher means having a cylindrical outer shape,
housing means surrounding said grass catcher means and including guide means opposed to said top opening of said grass catcher means for guiding the grass clippings to said top opening, said housing means also including a cylindrical portion having a larger diameter than and surrounding a lateral wall of said grass catcher means and a lid portion closable on a top plane of said cylindrical portion, said guide means being provided on said lid portion, and
a flow space defined between said grass catcher means and said housing means and communicating at one end thereof with said cutting blade means and at the other end with said top opening defined in said grass catcher means, grass clippings being fed with air currents from said cutting blade means to said grass catcher means through said flow space.

2. A grass cutting system as claimed in claim 1, wherein said guide means includes, centrally thereof, an exhaust passage for discharging the air currents fed from said cutting blade means, and guide vanes extending radially from said exhaust passage.

3. A grass cutting system as claimed in claim 2, wherein said grass catcher means includes a porous cylinder extending vertically through a central position thereof, said porous cylinder having one end thereof opposed to said exhaust passage whereby the air currents entering said grass catcher member are discharged through said porous cylinder.

4. A grass cutting system as claimed in claim 1, wherein said guide means includes, centrally thereof, an exhaust passage extending horizontally for discharging the air currents fed from said cutting blade means.

5. A grass cutting system as claimed in claim 1, wherein said grass catcher means includes a grass storing portion having a plurality of part containers arranged in a ring form.

6. A grass cutting system as claimed in claim 1, wherein said cutting blade means is vertically displaceable relative to said housing means.

7. A grass cutting system as claimed in claim 6, wherein said cutting blade means further includes a cutting blade housing, and a blade shaft supported by said cutting blade housing and extending vertically, said cutting blade being secured to said blade shaft, said blade shaft being driven by transmission shaft means extending through the central position of said grass catcher means and including a telescoping mechanism.

8. A walking operator type lawn mower comprising;
a vehicle body having ground wheels,
an engine mounted in a rear region of said vehicle body,
a grass cutting system mounted in a forward region of said vehicle, said grass cutting system including;
cutting blade means including a cutting blade rotatable on a vertical axis,
a grass catching chamber in the form of a first wall surrounding a space, the chamber being disposed above said cutting blade means and defining a top opening,
housing means comprising a second wall surrounding said first wall, and
a flow space defined between said grass catching chamber and said housing means and communicating at one end thereof with said cutting blade means and at the other end with said top opening defined in said grass catching chamber, grass clippings being fed with air currents from said cutting blade means to said grass catching chamber through said flow space.

9. A walking operator type lawn mower as claimed in claim 8, wherein said ground wheels are vertically displaceable relative to said vehicle body to vary height of said cutting blade means from the ground.

10. A walking operator type lawn mower as claimed in claim 8, wherein said cutting blade means further includes a blade shaft extending vertically and supported by a support frame secured to said vehicle body, said cutting blade being secured to said blade shaft, said blade shaft receiving engine power from transmission shaft means extending horizontally through said housing means.

11. A walking operator type lawn mower as claimed in claim 10, wherein said ground wheels consist of a pair of right and left free rotatable wheels disposed at a front position of said vehicle boby, and a pair of right and left drive wheels disposed at a rear position of said vehicle body to be driven by said engine, said grass cutting system being mounted between said freely rotatable wheels and said drive wheels.

12. A riding type lawn mower comprising;
a vehicle body having front wheels and rear wheels,
an engine mounted in a rear region of said vehicle body,
a grass cutting system mounted in a forward region of said vehicle, said grass cutting system including;
cutting blade means including a cutting blade rotatable on a vertical axis,
grass catcher means disposed above said cutting blade means and defining a top opening,
housing means surrounding said grass catcher means, and
a flow space defined between said grass catcher means and said housing means and communicating at one end thereof with said cutting blade means and at the other end with said top opening defined in said grass catcher means, grass clippings being fed with air currents from said cutting blade means to said grass catcher means through said flow space.

13. A riding type lawn mower as claimed in claim 12, wherein said cutting blade means is vertically displaceable relative to said housing means.

14. A riding type lawn mower as claimed in claim 13, wherein said cutting blade means further includes a cutting blade housing, and a blade shaft supported by said cutting blade housing and extending vertically, said cutting blade being secured to said blade shaft, said blade shaft being driven by transmission shaft means extending through the central position of said grass catcher means and including a telescoping mechanism.

15. A riding type lawn mower as claimed in claim 13, wherein said grass cutting system is mounted between said front wheels and said rear wheels.

16. A riding type lawn mower as claimed in claim 15, wherein said grass catcher means has a cylindrical outer shape, and said housing means includes a cylindrical portion having a larger diameter than and surrounding a lateral wall of said grass catcher means, and a lid portion closable on a top plane of said cylindrical portion, said guide means being provided on said lid portion.

17. A riding type lawn mower as claimed in claim 16, further comprising a driver's seat mounted on said lid portion.

18. A riding type lawn mower as claimed in claim 17, wherein said lid portion includes an exhaust passage extending horizontally below said driver's seat for discharging the air currents fed from said cutting blade means.

19. A riding type lawn mower as claimed in claim 15, wherein said vehicle body includes two frames extending parallel to each other and longitudinally of said vehicle body, said frames being shaped to project outwardly at intermediate positions thereof, respectively, to form a space for accommodating said grass cutting system.

20. A riding type lawn mower as claimed in claim 12, wherein said grass catcher means is a grass catching chamber.

21. A grass cutting system comprising:
cutting blade means including a cutting blade rotatable on a vertical axis,
a grass catching chamber in the form of a first wall surrounding a space, the chamber being disposed above said cutting blade means and defining a top opening,
housing means comprising a second wall surrounding said first wall, and
a flow space defined between said grass catching chamber and said housing means and communicating at one end thereof with said top opening defined in said grass catching chamber, grass clippings being fed with air currents from said cutting blade means to said grass catching chamber through said flow space.

* * * * *